US008664293B2

(12) United States Patent
Cilurzo et al.

(10) Patent No.: US 8,664,293 B2
(45) Date of Patent: Mar. 4, 2014

(54) AQUEOUS POLYMERIC SYSTEM FOR PRESSURE SENSITIVE ADHESIVE MATRIX PREPARATION

(75) Inventors: Francesco Cilurzo, Milan (IT); Paola Minghetti, Monza (IT)

(73) Assignee: Pharmafilm S.R.L., Gaggiano (IT)

( * ) Notice: Subject to any disclaimer, the term of this patent is extended or adjusted under 35 U.S.C. 154(b) by 982 days.

(21) Appl. No.: 11/886,652

(22) PCT Filed: Mar. 17, 2005

(86) PCT No.: PCT/EP2005/051245
§ 371 (c)(1),
(2), (4) Date: Sep. 17, 2007

(87) PCT Pub. No.: WO2006/097149
PCT Pub. Date: Sep. 21, 2006

(65) Prior Publication Data
US 2009/0018514 A1 Jan. 15, 2009

(51) Int. Cl.
A61F 13/02 (2006.01)
A61K 9/70 (2006.01)
A61M 35/00 (2006.01)
A61L 15/00 (2006.01)

(52) U.S. Cl.
USPC ........... 523/111; 604/289; 524/306; 524/311; 524/377; 524/560

(58) Field of Classification Search
USPC ........... 523/111; 604/289; 524/560, 306, 311, 524/377
See application file for complete search history.

(56) References Cited

U.S. PATENT DOCUMENTS

| 3,337,484 | A | * | 8/1967 | Cobbledick et al. | 524/558 |
| 4,280,942 | A | * | 7/1981 | Green | 524/271 |
| 5,270,358 | A | * | 12/1993 | Asmus | 524/55 |
| 5,834,538 | A | * | 11/1998 | deHullu et al. | 524/22 |
| 6,231,883 | B1 | * | 5/2001 | Inosaka et al. | 424/443 |
| 2003/0170295 | A1 | * | 9/2003 | Kim et al. | 424/449 |
| 2004/0028721 | A1 | * | 2/2004 | Colombo et al. | 424/443 |
| 2004/0096651 | A1 | * | 5/2004 | Yamamoto et al. | 428/343 |
| 2004/0137004 | A1 | * | 7/2004 | Glenn et al. | 424/184.1 |
| 2006/0115522 | A1 | * | 6/2006 | Lulla et al. | 424/448 |

FOREIGN PATENT DOCUMENTS

| WO | WO 0021582 A1 * | 4/2000 |
| WO | PCT/KR 01/00783 | 7/2001 |
| WO | WO 01/87276 A1 | 11/2001 |
| WO | WO 0187276 A1 * | 11/2001 |

OTHER PUBLICATIONS

WO0021582A1, Apr. 2000, Cilurzo, Derwent Abstract.*
Minghetti et al.; Comparison of Different Membranes with Cultures of Keratinocytes from Man for Percutaneous absorption of Nitroglycerine; J. Pharm. Pharmacol. 1999 51:673-678.
Venkatraman et al.; Skin Adhesives and Shin Adhesion 1. Transdermal Drug Delivery Systems; Biomaterials (1998) 19:1119-1136; Elsevier.

* cited by examiner

*Primary Examiner* — Satya Sastri
(74) *Attorney, Agent, or Firm* — Abelman, Frayne & Schwab

(57) ABSTRACT

A water based polymeric dispersion for PSA adhesive preparation for transdermal system comprising: a) an aqueous dispersion of a polymer of an acrylate and/or a methacrylate ester, b) a plasticizer c) a shrinkage reducing agent able to reduce the shrinkage of the water PSA dispersion when spread onto a surface to width values lower than 20 mm after 3 minutes rest.

20 Claims, 2 Drawing Sheets

Table 1a

| Form. no | OXY | THIO | PRX | DK | NCT | DNa | LID | OD | TTO | PRO | EuNE 30D | EuNE 40D | HEC | CMC | PLE | Gly | TBC | ATEC | ATBC | DBS | PG | Tr | Vit.E | OA | NaOH | Water |
|---|---|---|---|---|---|---|---|---|---|---|---|---|---|---|---|---|---|---|---|---|---|---|---|---|---|---|
| 1 | - | - | - | - | - | - | - | - | - | - | - | 90.4 | 0.4 | - | - | - | - | 7.3 | - | - | - | 1.8 | - | - | - | - |
| 2 | - | - | - | - | - | - | - | - | - | - | - | 85.4 | 0.03 | - | - | - | - | - | 14.1 | - | - | - | - | - | - | - |
| 3 | - | - | - | - | - | - | - | - | - | - | - | 69.7 | 0.3 | - | - | - | - | 27.9 | - | - | - | 2.1 | - | - | - | - |
| 4 | - | - | - | - | - | - | - | - | - | - | - | 78.3 | 0.4 | - | - | - | - | 18.9 | - | - | - | 2.4 | - | - | - | - |
| 5 | - | - | - | - | - | - | - | - | - | - | - | 78.3 | 0.4 | - | - | - | - | - | - | - | 16.9 | 2.4 | - | - | - | - |
| 6 | - | - | - | - | - | - | - | - | - | - | - | 73.9 | 0.4 | - | - | - | - | - | - | - | 23.5 | 2.2 | - | - | - | - |
| 7 | - | - | - | - | - | - | - | - | - | - | - | 69.7 | 0.3 | - | - | - | - | - | - | - | 27.9 | 2.1 | - | - | - | - |
| 8 | - | - | - | - | - | - | - | - | - | - | - | 85.4 | 0.5 | - | - | - | - | 14.1 | - | - | - | - | - | - | - | - |
| 9 | - | - | - | - | - | - | - | - | - | - | - | 85.4 | 0.5 | - | - | - | - | - | 14.1 | - | - | - | - | - | - | - |
| 10 | - | - | - | - | - | - | - | - | - | - | - | 85.4 | 0.5 | - | - | - | - | - | - | 14.1 | - | - | - | - | - | - |
| 11 | - | - | - | - | - | - | - | - | - | - | - | 85.4 | 0.5 | - | 14.1 | - | - | - | - | - | - | - | - | - | - | - |
| 12 | - | - | - | - | - | - | - | - | - | - | - | 85.4 | 0.5 | - | - | - | - | - | - | - | 14.1 | - | - | - | - | - |
| 13 | - | - | - | - | - | - | - | - | - | - | - | 88.4 | 1.1 | - | - | - | - | - | 10.6 | - | - | - | - | - | - | - |
| 14 | - | - | - | - | - | - | - | - | - | - | - | 88 | 0.3 | - | - | - | - | - | 10.7 | - | - | - | - | - | - | - |
| 15 | - | - | - | - | - | - | - | - | - | - | - | 89 | 0.2 | - | - | - | - | 10.8 | - | - | - | - | - | - | - | - |
| 16 | - | - | - | - | - | - | - | - | - | - | - | 78.5 | 0.1 | - | - | - | - | - | 21.4 | - | - | - | - | - | - | - |
| 17 | - | - | - | - | - | - | - | - | - | - | - | 74.9 | 0.4 | - | - | - | 24.7 | - | - | - | - | - | - | - | - | - |
| 18 | - | - | - | - | - | - | - | - | - | - | - | 83.4 | 0.1 | - | - | - | 16.5 | - | - | - | - | - | - | - | - | - |
| 19 | - | - | - | - | - | - | - | - | - | - | - | 71.2 | 0.1 | - | - | - | 28.7 | - | - | - | - | - | - | - | - | - |
| 20 | - | - | - | - | - | - | - | - | - | - | - | 71.3 | 0.1 | - | - | - | 28.5 | - | - | - | - | - | - | - | - | - |
| 21 | - | - | - | - | - | - | - | - | - | - | - | 82.9 | 0.2 | - | - | - | 16.9 | - | - | - | - | - | - | - | - | - |
| 22 | - | - | - | - | - | - | - | - | - | - | - | 89.2 | 0.1 | - | - | - | - | 10.7 | - | - | - | - | - | - | - | - |
| 23 | - | - | - | - | - | - | - | - | - | - | - | 89.1 | 0.2 | - | - | - | 10.7 | - | - | - | - | - | - | - | - | - |
| 24 | 2.8 | - | - | - | - | - | - | - | - | - | - | 58.3 | 0.1 | - | - | - | - | 38.9 | - | - | - | - | - | - | - | - |
| 25 | - | - | 1 | - | - | - | - | - | - | - | - | 68.1 | 0.1 | - | - | - | - | 27.2 | - | - | - | 2 | - | - | 0.6 | - |
| 26 | - | 1 | 1 | - | - | - | - | - | - | - | - | 60.4 | 0.1 | - | - | - | 27.8 | - | - | - | - | 9.7 | - | - | - | - |
| 27 | - | 1.1 | 1.1 | - | - | - | - | - | - | - | - | 62.3 | 0.1 | - | - | - | 24.9 | - | - | - | - | 10 | - | - | 0.6 | - |
| 28 | - | - | - | - | - | - | - | - | - | - | - | 63.3 | 0.1 | - | - | - | 24 | - | - | - | - | 12.7 | - | - | - | - |
| 29 | - | 1.2 | - | - | - | - | - | - | - | - | - | 67.8 | 0.1 | - | - | - | 27.1 | - | - | - | - | 2 | - | - | - | - |

Fig.1 Table 1a

| Form. no | OXY | THIO | PRX | DK | NCT | DNa | LID | OD | TTO | PRO | EuNE 30D | EuNE 40D | HEC | CMC | PLE | Gly | TBC | ATEC | ATBC | DBS | PG | Tr | VitE | OA | NaOH | Water |
|---|---|---|---|---|---|---|---|---|---|---|---|---|---|---|---|---|---|---|---|---|---|---|---|---|---|---|
| 1 | - | - | - | - | - | - | - | - | - | - | - | 90.4 | 0.4 | - | - | - | - | 7.3 | - | - | - | 1.8 | - | - | - | - |
| 2 | - | - | - | - | - | - | - | - | - | - | - | 85.4 | - | 0.03 | - | - | - | - | 14.1 | - | - | - | - | - | - | - |
| 3 | - | - | - | - | - | - | - | - | - | - | - | 69.7 | 0.3 | - | - | - | - | 27.9 | - | - | - | 2.1 | - | - | - | - |
| 4 | - | - | - | - | - | - | - | - | - | - | - | 78.3 | 0.4 | - | - | - | - | 18.9 | - | - | - | 2.4 | - | - | - | - |
| 5 | - | - | - | - | - | - | - | - | - | - | - | 78.3 | 0.4 | - | - | - | - | - | - | - | 18.9 | 2.4 | - | - | - | - |
| 6 | - | - | - | - | - | - | - | - | - | - | - | 73.9 | 0.4 | - | - | - | - | - | - | - | 23.5 | 2.2 | - | - | - | - |
| 7 | - | - | - | - | - | - | - | - | - | - | - | 69.7 | 0.3 | - | - | - | - | - | - | - | 27.9 | 2.1 | - | - | - | - |
| 8 | - | - | - | - | - | - | - | - | - | - | - | 86.4 | 0.5 | - | - | - | - | 14.1 | - | - | - | - | - | - | - | - |
| 9 | - | - | - | - | - | - | - | - | - | - | - | 85.4 | 0.5 | - | - | 14.1 | - | - | - | - | - | - | - | - | - | - |
| 10 | - | - | - | - | - | - | - | - | - | - | - | 85.4 | 0.5 | - | - | - | - | - | 14.1 | - | - | - | - | - | - | - |
| 11 | - | - | - | - | - | - | - | - | - | - | - | 85.4 | 0.5 | - | - | - | - | - | - | 14.1 | - | - | - | - | - | - |
| 12 | - | - | - | - | - | - | - | - | - | - | - | 85.4 | 0.5 | - | - | - | - | - | - | - | 14.1 | - | - | - | - | - |
| 13 | - | - | - | - | - | - | - | - | - | - | - | 88.4 | 1.1 | - | - | - | 24.7 | - | - | - | - | - | - | - | - | - |
| 14 | - | - | - | - | - | - | - | - | - | - | - | 89 | 0.3 | - | - | - | 16.5 | - | - | 10.6 | - | - | - | - | - | - |
| 15 | - | - | - | - | - | - | - | - | - | - | - | 89 | 0.2 | - | - | - | 28.7 | - | - | 10.7 | - | - | - | - | - | - |
| 16 | - | - | - | - | - | - | - | - | - | - | - | 78.5 | 0.1 | - | - | - | 28.5 | 10.8 | - | - | - | - | - | - | - | - |
| 17 | - | - | - | - | - | - | - | - | - | - | - | 74.9 | 0.4 | - | - | - | 16.9 | 21.4 | - | - | - | - | - | - | - | - |
| 18 | - | - | - | - | - | - | - | - | - | - | - | 83.4 | 0.1 | - | - | - | - | - | - | - | - | - | - | - | - | - |
| 19 | - | - | - | - | - | - | - | - | - | - | - | 71.2 | 0.1 | - | - | - | 10.7 | - | - | - | - | - | - | - | - | - |
| 20 | - | - | - | - | - | - | - | - | - | - | - | 71.3 | 0.1 | - | - | - | - | - | - | - | - | - | - | - | - | - |
| 21 | - | - | - | - | - | - | - | - | - | - | - | 82.9 | 0.2 | - | - | - | - | 10.7 | - | - | - | - | - | - | - | - |
| 22 | - | - | - | - | - | - | - | - | - | - | - | 89.2 | 0.1 | - | - | - | - | - | - | - | - | - | - | - | - | - |
| 23 | - | - | - | - | - | - | - | - | - | - | - | 89.1 | 0.2 | - | - | - | - | - | - | - | - | - | - | - | - | - |
| 24 | 2.8 | - | - | - | - | - | - | - | - | - | - | 58.3 | 0.1 | - | - | - | - | - | 38.9 | - | - | - | - | - | - | - |
| 25 | - | - | 1 | - | - | - | - | - | - | - | - | 68.1 | 0.1 | - | - | - | - | 27.2 | - | - | - | 2 | - | - | 0.6 | - |
| 26 | - | 1 | 1 | - | - | - | - | - | - | - | - | 60.4 | 0.1 | - | - | - | 27.8 | - | - | - | - | 9.7 | - | - | - | - |
| 27 | - | 1.1 | 1.1 | - | - | - | - | - | - | - | - | 62.3 | 0.1 | - | - | - | 24.9 | - | - | - | - | 10 | - | - | 0.6 | - |
| 28 | - | - | - | - | - | - | - | - | - | - | - | 63.3 | 0.1 | - | - | - | 24 | - | - | - | - | 12.7 | - | - | - | - |
| 29 | - | 1.2 | - | - | - | - | - | - | - | - | - | 67.8 | 0.1 | - | - | - | - | 27.1 | - | - | - | 2 | - | - | - | - |

Fig.2 Table 1b

| Form. no | Oxy HCl | THIO | PRX | DK | NCT | DNa | LID | OD | TTO | PRO | EuNE 30D | EuNE 40D | HEC | CMC | PLE | TBC | ATEC | ATBC | DBS | Triacetin | Tr | Vit E | OA | Water |
|---|---|---|---|---|---|---|---|---|---|---|---|---|---|---|---|---|---|---|---|---|---|---|---|---|
| 30 | - | - | - | - | - | 1,1 | - | - | - | - | - | 73,7 | - | - | - | 20,4 | - | - | - | - | - | - | 2,7 | - |
| 31 | - | - | - | - | - | 1,5 | - | - | - | - | - | 69,5 | - | - | - | 23,4 | - | - | - | - | - | - | 2,5 | - |
| 32 | - | - | - | - | - | 1,7 | - | - | - | - | - | 65,7 | - | - | - | 26,3 | - | - | - | - | - | - | 2,9 | - |
| 33 | - | - | - | - | - | 1,7 | - | - | - | - | - | 65,7 | - | - | - | - | 26,3 | - | - | - | - | - | 2,9 | - |
| 34 | - | - | - | - | - | 1,4 | - | - | - | - | - | 83,5 | - | - | - | 9,9 | - | - | - | - | - | - | 2,4 | - |
| 35 | - | - | - | - | - | 1,6 | - | - | - | - | - | 71,0 | - | - | - | 20,4 | - | - | - | - | - | - | 3,8 | - |
| 36 | - | - | - | 1,7 | - | - | - | - | - | - | - | 70,1 | - | - | - | 28,1 | - | - | - | - | - | - | - | - |
| 37 | - | - | - | 2,0 | - | - | - | - | - | - | - | 82,0 | - | - | - | 15,9 | - | - | - | - | - | - | - | - |
| 38 | - | - | - | 3,6 | - | - | - | - | - | - | - | 67,6 | - | - | - | 27,0 | - | - | - | - | - | - | 1,8 | - |
| 39 | - | - | - | 2,0 | - | - | - | - | - | - | - | 54,5 | - | - | - | - | - | - | 43,5 | - | - | - | - | - |
| 40 | - | - | - | 1,7 | - | - | - | - | - | - | - | 69,7 | - | - | - | 28,0 | - | - | - | - | - | 0,6 | - | - |
| 41 | - | - | - | - | 1,7 | - | - | - | - | - | - | 70,1 | - | - | - | - | - | 28,1 | - | - | - | - | - | - |
| 42 | - | - | - | - | 0,9 | - | - | - | - | - | 71,3 | - | - | - | - | 27,8 | - | - | - | - | - | - | - | - |
| 43 | - | - | - | - | - | - | 1,1 | - | - | - | - | 73,7 | - | - | - | 20,4 | - | - | - | - | - | - | 2,7 | - |
| 44 | - | - | - | - | - | - | 1,5 | - | - | - | - | 69,5 | - | - | - | 23,4 | - | - | - | - | - | - | - | - |
| 45 | - | - | - | - | - | - | - | 2 | - | - | 142 | - | 1 | - | 12 | 43 | - | - | - | - | - | - | - | - |
| 46 | - | - | - | 4 | - | - | - | - | - | - | - | 117 | 0.05 | - | 0.5 | - | - | - | - | - | - | - | - | - |
| 47 | - | - | - | - | - | - | - | - | - | - | - | 69.3 | - | - | 2.9 | 27.7 | - | - | 47 | - | - | - | - | - |
| 48 | - | - | - | - | - | - | - | - | - | - | - | 87.1 | - | - | 2.4 | 10.5 | - | - | - | - | - | - | - | - |
| 49 | - | - | - | - | - | - | - | - | 5.5 | - | - | 61.5 | - | - | 0.3 | - | - | 24.6 | - | - | - | - | - | 6.2 |
| 50 | - | 1.2 | 1.2 | - | - | - | - | - | - | - | - | 63 | - | - | 3.1 | 25.3 | - | - | - | - | 6.2 | - | - | - |
| 51 | - | - | - | - | - | - | - | - | - | 1.37 | - | 68.5 | - | - | 2.7 | - | - | 27 | - | - | - | - | - | - |
| 52 | 5.4 | - | - | - | - | - | - | - | - | - | - | 53.9 | 0.3 | - | - | 21.6 | - | - | - | - | 8.1 | - | - | 10.8 |
| 53 | | | | | | | | | | | | 18 | | | 0.1 | | | | | 7.2 | | | | |
| 54 | | | | | | | | | | | | 18 | | | 0.1 | | | | | 7.2 | | | | |
| 55 | | | | | | | | | | | | 71.42 | 0.01 | | | | | | | 28.57 | | | | |

Note: OXY: oxybutynin; TBC:tributyl citrate; ATEC: acetyltriethyl citrate; ATBC: acetyltributyl citrate; DBS: dibuthyl sebacate HEC:hydroxyethylcellulose; Gly: glycerine; PG: propylene glicol; Tr: transcutol; NaOH: NaOH 10 m/m acqueous solution; CMC; sodium carboxymethylcellulose; EuNE 40D: 40% dispersion of polyacrilate copolymer of methyl and/or ethylesters of acrylic acid and methacrylic; EuNE 30D: 30% dispersion of polyacrilate copolymer of methyl and/or ethylesters of acrylic acid and methacrylic acid; Vit E Vitamine E acetate; D Na : sodium diclofenac; D K: potassium diclofenac; NCT:nicotine ; LID:lidocaine; OD ondansetron HCl; PRO: propranolol; TTO: tea tree oil; PRX: piroxicam; THIO: thiocolchicoside; OA: oleic acid ; OXYHCl: oxybutynin hydrochloride.
PLE: polyoxyethylene lauryl ether;

AQUEOUS POLYMERIC SYSTEM FOR PRESSURE SENSITIVE ADHESIVE MATRIX PREPARATION

FIELD OF THE INVENTION

The present invention relates to water based polymeric dispersions for the preparation of pressure sensitive adhesive and transdermal patches containing the pressure sensitive adhesive prepared with said water based polymeric dispersions.

STATE OF THE ART

Transdermal delivery systems (TDS) are self-adhesive dosage forms that, when applied onto intact skin, are designed to deliver the drug through the skin to the systemic circulation. The same types of systems are used today also to obtain local or regional effects.

The simplest patch design consists of a flexible backing layer, an adhesive controlled release matrix containing the drug and a removable protecting layer.

The polymeric matrices used in transdermal patch formulations are mainly made of "pressure sensitive adhesives" (PSA) that are defined as adhesives capable of bonding to surfaces with the application of light pressure and when detached do not leave any visually noticeable residue.

PSA may be classified according to the physical form in which the PSA is supplied or according to the chemical structure. As far as the physical form is concerned, PSA fall into three broad products categories: solvent based, water based, and hot melt. Solvent based PSA are traditionally used in TDS production, even if water based and hot melt PSA are more beneficial as skin irritation, sensitisation and environmental contamination risks are reduced.

PSAs generally used in patch development are characterised by a lipophylic domain. PSAs with some hydrophilic characteristics could improve suitable patch/skin contact (Venkatraman and Gale, 1998). Moreover, hydrophilic PSAs could feature some further advantages due to the following: (a) polar drugs can be loaded; (b) completely water soluble PSAs show special patient compliance; (c) long term wear requires some hydrophilicity. All such advantages were variously patented as hydrophilic PSAs or, in some cases, completely water soluble PSAS. Well known aqueous adhesive systems are based on methacrylic copolymers. The proposed PSA are mainly based on the employment of polyaminomethylmethacrilate (U.S. Pat. No. 5,133,970) polymethylmethacrilate (U.S. Pat. No. 5,296,512) alone or in combination with other polymers (WO 0021582; WO 0154674, EP1458366, WO0230402). The feasibility of preparing a PSA suitable for transdermal preparation by using a polyacrylate copolymer of methyl and/or ethylesters of acrylic acid and methacrylic acid having an average molecular weight of 800,000 was also reported in the DE 3204551 and U.S. Pat. No. 4,490,322.

The copolymer is available on the market as a latex and the inventor prepared the PSA freeze-drying the latex dissolving it in an organic solvent i.e. methylene chloride. More recently WO 03/061621 reported the feasibility of preparing transdermal patches, intended for the administration of derivatives of aminolevulinic acid, by using a PSA constituted by the active ingredient, a freeze dried polyacrylate copolymer of methyl and/or ethylesters of acrylic acid and methacrylic acid and acetyltributhylcitrate dissolved in acetone. The cited patents presented the environmental risks associated to the use of an inorganic solvent and the cost due to the freeze drying process. However the preparation of such PSA cannot be not obtained simply by adding a plasticizer in the aqueous dispersion of polyacrylate copolymer of methyl and/or ethylesters of acrylic acid and methacrylic acid.

In fact the obtained polymeric systems are not suitable for patch preparation because of their low viscosity and high surface tension which cause the shrinkage of the mixture coated onto the release liner.

TECHNICAL PROBLEM

Therefore the need was felt to prepare patches using a PSA based on polyacrylate copolymer of methyl and/or ethylesters of acrylic acid and methacrylic acid, presenting a higher water resistance like the PSA solvent system, avoiding the freeze drying process and the use of organic solvents and which contemporaneously do not shrink when spread on to the release liner.

SUMMARY OF THE INVENTION

The Applicant has now unexpectedly found a water based polymeric dispersion for PSA adhesive preparation for transdermal system comprising:
a) an aqueous dispersion of a polymer of an acrylate and/or a methacrylate ester,
b) a plasticizer
c) a shrinkage reducing agent able to reduce the shrinkage of the water PSA dispersion when spread onto a surface to width values lower than 20 mm after 3 minutes rest.

With this type of composition it is possible to prepare PSA adhesive matrix of ester polyacrylates without freeze drying and adding organic solvents.

The present invention further relates to the process for preparing said water based aqueous polymeric dispersion comprising in particular the following steps:
i) the shrinkage reducing agent is dispersed or solubilized in the plasticiser
ii) the aqueous dispersion of polyacrylate copolymer of methyl and/or ethylesters of acrylic acid and methacrylic acid was added to the mixture prepared in the preceding step and the system was mixed.

The present invention further relates to a transdermal patch comprising as the adhesive matrix in which the active ingredient is dispersed in the PSA matrix prepared with the water based polymeric composition according to the present invention.

DESCRIPTION OF THE FIGURES

FIGS. 1 and 2 report in the form of table 1A and table 1B the aqueous dispersion according to the present invention prepared as described in Example 1.

DETAILED DESCRIPTION OF THE INVENTION

Preferably the shrinkage reducing agent used in the water based polymeric dispersions according to the present invention is able to reduce the shrinkage of the water PSA dispersion when spread onto a surface to width values lower than 12 mm after 2 minutes rest.

The shrinkage reducing agent is preferably selected from the group consisting of the active ingredient itself, an oil, a surfactant or a colloid.

When the active ingredient is also used as the shrinkage reducing agent it is preferably contained in amounts ranging from 0.5% to 30% and more preferably from 1% to 20% by weight based on the dry copolymer weight For example when the active ingredient is oxybutinin, diclofenac potassium salt, nicotine, the same active ingredient acts also as the shrinkage reducing agent. When an oil is used as the shrinkage reducing agent it is preferably contained in the water based polymeric dispersion according to the present invention in amounts ranging from 0.1-15% by weight based on the dry copolymer weight.

The oil are preferably selected from, tea tree oil, oleic acid, liquid semisynthetic triglycerides preferably with medium chain fatty acids $C_8$-$C_{10}$, like the products available with the commercial name Miglyol®.

When the colloid is used as the shrinkage reducing agent in the water based polymeric dispersion according to the present invention it is preferably a hydrocolloid and more preferably it is selected from a cellulose derivative like sodium carboxymethylcellulose, cellulose ethers like ethylcellulose, hydroxypropylmethylcellulose, hydroxyethycellulose, and it is contained in amounts ranging from 0.001 to 2% more preferably between 0.01-2% by weight based on the dry copolymer weight.

The surfactant are preferably selected from long chain alcohols or salified long chain acids, polyoxyethylenalcohols in amounts ranging from 0.1 to 10%, more preferably in amounts of from 1 to 8% by weight based on the dry copolymer weight.

Said polymer in the aqueous dispersion (a) is a copolymer of a $C_1$-$C_{10}$ alkyl ester of an acrylic and a methacrylic acid and it is contained in said dispersion in amounts ranging from 10 to 50% by weight based on the total dispersion weight. More preferably it is the copolymer of ethyl acrylate and methyl methacrylate and it is contained in amounts ranging from 25 to 45% based on the total dispersion weight.

According to a particularly preferred embodiment the aqueous polymeric dispersion contains said copolymer of ethyl acrylate and methyl methacrylate in amounts respectively of 30 and 40% by weight on the total dispersion weight, namely the latex dispersion commercially available with thr name Eudragit® E30 and Eudragit ®E40.

The plasticizer, namely the component (b) present in the water based polymeric dispersions according to the present invention is preferably contained in amounts ranging from 20% to 180% and preferably between 30% and 130% by weight, based on the dry polymer weight. It is preferably chosen from the group consisting of polyalcohols, such as propyleneglycol and glycerol, citric acid esters, sebacic acid esters, triacetin or their mixtures. Citric acid esters, sebacic acid esters are particularly preferred.

Optionally, it is possible to add skin absorption enhancers to the water based polymeric dispersion of the invention without affecting the viscous properties of the system. Amongst the absorption promoters the following may be cited as examples: Transcutol (diethylen glycolmonoethyl-ether), propylene glycol, polyhydroxylated castor oil, polyethylene glycols of different molecular weights, unsaturated and saturated acids and esters thereof such as isopropylmyristate, Lauroglycol (propylenglycol monolaurate or dilaurate), Labrafil (macrogol glyceride ester with oleic acid), Labrasol (macrogol glyceride with caprylic acid), polysorbates such as Tween®, and Span®D and in particular Span® 80, polyoxyethylenalcohols such as Brij®, and in particular Brij® 58 (cetomacrogol 1000), and terpenes, such as limonene menthol, eucalyptol.

Other excipient which can be added to the matrix are antioxidants or preservatives.

Some examples of formulations for the water based PSA of the present invention, some processes for preparing said PSA, as well as in vitro tests conducted on patches obtained with some of the illustrated formulations are given by way of non limiting examples.

EXAMPLE 1

Process of Fabrication
1-A Preparation of the Aqueous Polymeric Dispersion

The aqueous polymeric systems reported, in Table 1A of FIG. 1 and Table 1B of FIG. 2, were prepared by adding all the component, except EuNE40D or EuNE30D, to the plasticizer maintained under stirring. The EuNE40D (Eudragit® NE 40) or EuNE30D (Eudragit® NE30D) was added to the mixture and the system was maintained under stirring for at least 2 hours.

The resulting aqueous polymeric system was left to stand, up to complete removal of any air that might have been englobed therein, before being used.
1-B Determination of the Shrinkage of the Aqueous Polymeric System Coated onto a Release Liner The reduction of the shrinkage is measured spreading the polymeric system onto the release liner (siliconized and fluorosiliconized polyester film) with a thickness of 350 µm onto the release and a width of about 10 cm. The film does not reduce its width more than 10 mm after 3 min of rest.

All the mixture aqueous polymeric system reported in Table 1a and table 1b complies with the specification reported above.
1-C Preparation of the Patches The aqueous polymeric systems reported in Table 1a and Table 1b were used for preparing the following specifications:

| | |
|---|---|
| Release liner: | Siliconized or Fluorosiliconized Liner |
| Backing layer: | Polyethylene, polypropylene, polyurethane, polyester film or woven non-woven materials. |
| Spreading on the release liner and drying of the matrix were performed with a Mathis coating machine - Model: LTE-S | |
| Rate of spreading: | 1 m/min |
| Drying time: | 15 min |
| Drying temperature: | 60° C. with horizontal air circulation |
| Distance between doctor knife and release liner: | 100-400 µm |
| At the end of the drying process, the dried adhesive matrix was made to adhere to the backing layer. | |

The obtained patch was packaged in air-impermeable primary packaging and stored at 25° C.

EXAMPLE 2

The peel adhesion values of the patches prepared with the formulations 3-7, 16, 31-33, 37 assayed according the PSTC 1 Method are reported in Table 2.

TABLE 2

| Form. no | Peel adhesion values (cN/cm) |
|---|---|
| 3 | 110 ± 10 |
| 4 | 123 ± 9 |
| 5 | 111 ± 11 |
| 6 | 37 ± 5 |
| 7 | 29 ± 4 |
| 16 | 237 ± 21 |

TABLE 2-continued

| Form. no | Peel adhesion values (cN/cm) |
|---|---|
| 31 | 73 ± 9 |
| 32 | 127 ± 22 |
| 33 | 121 ± 40 |
| 37 | 50 ± 6 |

EXAMPLE 3

Determination of the Human Skin Permeation of Piroxicam and Thiocolchicoside by using Formulation No 50

3-a Thiocoichicoside and Piroxicam Content

The Thiocolchicoside and Piroxicam content were determined by dissolving a 2.54 cm² sample in methyl alcohol and diluted in a suitable volume of phosphate buffer (pH 7.4). These solution were filtered (Durapore® membrane, pore size 0.45 µm; Millex GV, Millipore corporation, USA) and assayed by HPLC.

3-b Study of Percutaneous Permeability

The in vitro permeability studies were conducted by the modified Franz-type diffusion cell method (P. Minghetti, J. Pharm. And Pharmacol., 51(6): 729-734, 1999), using as membrane human epidermis from one and the same donor. The Thiocolchicoside and Piroxicam amount permeated were determined by HPLC-UV. The results are the mean of three determinations.

3-c Results

Thiocolchicoside and Piroxicam content and percutaneous permeability

| Form. no | PRX Content (µg/cm²) | THIO content (µg/cm²) | PRX amount permeated in 24 h (µg/cm²) | THIO amount permeated in 24 h (µg/cm²) |
|---|---|---|---|---|
| 50 | 200 | 200 | 15.15 ± 1.26 | 0.99 ± 0.14 |

EXAMPLE 4

Determination of the Human Skin Permeation of Potassium Diclofenac by Using Formulation No 36

4-a Diclofenac Content

The Diclofenac content was determined by dissolving a 2.54 cm² sample in methyl alcohol and diluted in a suitable volume of nitrile acetate:water:acetic acid (50:46:4 v/v). The solution was filtered (Durapore® membrane, pore size 0.45 µm; Millex GV, Millipore corporation, USA) and assayed by HPLC-UV.

4-b Percutaneous Permeability

The in vitro permeability studies were conducted by the modified Franz-type diffusion cell method (P. Minghetti, J. Pharm. And Pharmacol., 51(6): 729-734, 1999), using as membrane human epidermis from one and the same donor. The Diclofenac amount permeated was determined by HPLC-UV. The results are the mean of three determinations.

4-c Results

Diclofenac K content and percutaneous permeability

| Form | Content (mg/cm²) | Quantity permeated in 24 h (µg/cm²) |
|---|---|---|
| 7 | 1 | 33.4 ± 13.5 |

EXAMPLE 5

Determination of the Human Skin Permeation of Oxybutynin HCl by Using Formulation No 52

5-a Oxybutynin HCl

The Oxybutynin HCl content was determined by dissolving a 2.54 cm² sample in methyl alcohol and diluted in a suitable volume of methanol. The solution was filtered (Durapore® membrane, pore size 0.45 µm; Millex GV, Millipore corporation, USA) and assayed by HPLC-UV.

5-b Percutaneous Permeability

The in vitro permeability studies were conducted by the modified Franz-type diffusion cell method (P. Minghetti, J. Pharm. And Pharmacol., 51(6): 729-734, 1999), using as membrane human epidermis from one and the same donor. The oxybutynin HCl amount permeated was determined by HPLC-UV. The results are the mean of three determinations.

5-c Results

Oxybutinin HCl content and percutaneous permeability

| Form | Content (mg/cm²) | Quantity permeated in 24 h (µg/cm²) |
|---|---|---|
| 7 | 0.9 | 167 ± 19 |

The invention claimed is:

1. An adhesive aqueous polymeric system for PSA matrix for transdermal patches, said system having a shrinkage lower than 20 mm in width after 3 minutes from spreading onto a surface consisting essentially of:
   a) an aqueous dispersion of a copolymer of ethyl acrylate and methyl methacrylate said copolymer being in amounts ranging from 25% to 45% by weight based on the aqueous dispersion weight,
   b) a plasticizer selected from the group consisting of polyalcohols, citric acid esters, triacetin, sebacic acid esters and mixtures thereof, in an amount of 20% to 180% by weight, based on the dry copolymer weight, and
   c) a shrinkage reducing agent.

2. The aqueous polymeric system according to claim 1 wherein said system has a shrinkage lower than 12 mm in width after 2 minutes from spreading onto a surface.

3. The aqueous polymeric system according to claim 1, wherein said shrinkage reducing agent is selected from the group consisting of an active ingredient, an oil, a surfactant and a colloid.

4. The aqueous polymeric system according to claim 3, wherein when the active ingredient is used as the shrinkage reducing agent, it is contained in amounts ranging from 0.5% to 30% by weight based on the dry copolymer weight.

5. The aqueous polymeric system according to claim 4 containing the active ingredients in amounts from 1% to 20% by weight based on the dry copolymer weight.

6. The aqueous polymeric system according to claim 4, wherein said active ingredient is selected from the group consisting of oxybutinin, diclofenac potassium salt and nicotine.

7. The aqueous polymeric system according to claim 3, wherein when oil is used as the shrinkage reducing agent it is contained in amounts ranging from 0.1-15% by weight based on the dry copolymer weight.

8. The aqueous polymeric system according to claim 7, wherein the oil is selected from the group consisting of tea tree oil, oleic acid, liquid semisynthetic triglycerides.

9. The aqueous polymeric system according to claim 3, when the colloid is used as the shrinkage reducing agent, it is a hydrocolloid.

10. The aqueous polymeric system according to claim 9, wherein said hydrocolloid is selected from a cellulose derivative.

11. The aqueous polymeric system according to claim 10, wherein said cellulose ether is sodium carboxymethyylcellulose or a cellulose ether.

12. The aqueous polymeric system according to claim 9, wherein said hydrocolloid is contained in amounts ranging from 0.001 to 2% by weight based on the dry copolymer weight.

13. The aqueous polymeric system according to claim 12, wherein said hydrocolloid is contained in amounts ranging from 0.01-2% by weight based on the dry copolymer weight.

14. The aqueous polymeric system according to claim 1, wherein said copolymer of ethyl acrylate and methyl methacrylate is in an amount of 30 or 40% by weight based on the total dispersion weight.

15. The aqueous polymeric system according to claim 1, wherein said plasticizer is contained in amounts ranging from 30% and 130% by weight, based on the dry copolymer weight.

16. The aqueous polymeric system according to claim 1, wherein said plasticizer is selected from citric acid esters and sebacic acid esters.

17. The aqueous polymeric system according to claim 1, wherein said plasticizer is triacetin.

18. A process for preparing the aqueous polymeric system according to claim 1 comprising the following steps:
  i) the shrinkage reducing agent is dispersed or solubilized in the plasticiser,
  ii) the aqueous dispersion of a copolymer of ethyl acrylate and methyl methacrylate was added to the mixture prepared in the preceding step and the system was mixed.

19. A pressure sensitive adhesive matrix for transdermal patches prepared with aqueous polymeric system according claim 1.

20. A transdermal patch comprising the pressure adhesive matrix according to claim 19.

* * * * *